(12) United States Patent
Hanks et al.

(10) Patent No.: US 9,807,035 B1
(45) Date of Patent: Oct. 31, 2017

(54) USING AVAILABLE BANDWIDTHS OF AN IP FABRIC TO INTELLIGENTLY DISTRIBUTE DATA

(71) Applicant: Juniper Networks, Inc., Sunnyvale, CA (US)

(72) Inventors: Douglas R Hanks, Dublin, CA (US);
Yafan An, Fremont, CA (US);
Shunmugavel Rajarathinam, Alviso, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 213 days.

(21) Appl. No.: 14/675,254

(22) Filed: Mar. 31, 2015

(51) Int. Cl.
| | | |
|---|---|---|
| *H04L 12/02* | (2006.01) |
| *H04L 12/947* | (2013.01) |
| *H04L 12/933* | (2013.01) |
| *H04L 12/64* | (2006.01) |
| *H04L 12/825* | (2013.01) |

(52) U.S. Cl.
CPC .......... *H04L 49/25* (2013.01); *H04L 12/6402* (2013.01); *H04L 47/25* (2013.01); *H04L 49/15* (2013.01)

(58) Field of Classification Search
CPC ................. H04L 41/0896; H04L 47/10; H04L 2012/5624; H04L 41/0213; H04L 43/0882; H04L 45/00
See application file for complete search history.

(56) References Cited

U.S. PATENT DOCUMENTS

| 7,558,199 B1 * | 7/2009 | Minei ................. H04L 41/0896 370/230 |
| 7,567,512 B1 * | 7/2009 | Minei ................. H04L 43/0882 370/232 |
| 8,040,901 B1 * | 10/2011 | Kompella ............. H04L 12/437 370/395.71 |

(Continued)

FOREIGN PATENT DOCUMENTS

WO  2013184846 A1  12/2013

OTHER PUBLICATIONS

Hanks, "White Paper: Clos IP Fabrics with QFX5100 Switches," Juniper Networks, Mar. 2014, 25 pp.

(Continued)

*Primary Examiner* — Sai Aung
(74) *Attorney, Agent, or Firm* — Shumaker & Sieffert, P.A.

(57) ABSTRACT

In one example, a plurality of network devices forming an Internet protocol (IP) fabric includes first, second, third, and fourth network devices. The first network device includes a plurality of network interfaces communicatively coupled to at least the third and fourth network devices of the plurality of network devices, which are between the first network device and the second network device. The first network device also includes one or more hardware-based processors configured to determine available bandwidths for the third network device and the fourth network device toward the second network device, determine a ratio between the available bandwidths for the third and fourth network devices, and forward data (e.g., packets or bytes) toward the second network device such that a ratio between amounts of the data forwarded to the third and fourth network devices corresponds to the ratio between the available bandwidths.

30 Claims, 5 Drawing Sheets

(56) References Cited

U.S. PATENT DOCUMENTS

| | | | | |
|---|---|---|---|---|
| 9,084,139 B2* | 7/2015 | Damodaran | .......... | H04W 28/16 |
| 2003/0117945 A1* | 6/2003 | Zboril | .................. | H04J 3/14 |
| | | | | 370/216 |
| 2009/0028182 A1* | 1/2009 | Brooks | ............... | H04L 41/0896 |
| | | | | 370/466 |

OTHER PUBLICATIONS

Mohapatra, et al., "BGP Link Bandwidth Extended Community," Network Working Group, Jan. 22, 2013, 6 pp.

Gredler, et al., "North-Bound Distribution of Link-Sate and TE Information using BGP," Sep. 16, 2014, 44 pp.

"Example: Load Balancing BGP Traffic with Unequal Bandwidth Allocated to the Paths," Juniper Networks, accessed on Feb. 24, 2015, 9 pp.

Sangli, et al., "BGP Extended Communities Attribute," Network Working Group, RFC 4360, Feb. 2006, 12 pp.

Rosen, et al., "IANA Registries for BGP Extended Communities," Internet Engineering Task Force, RFC 7153, Mar. 2014, 16 pp.

"OpenFlow Switch Specification version 1.1.0" OpenFlow Consortium, Feb. 28, 2011, 56 pp.

* cited by examiner

USING AVAILABLE BANDWIDTHS OF AN IP FABRIC TO INTELLIGENTLY DISTRIBUTE DATA

TECHNICAL FIELD

This disclosure relates to computer networks.

BACKGROUND

In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities.

Data centers are often made up of a large number of devices, including both servers and devices forming the IP fabric. A relatively small number of the devices may be upgraded at a time, such that various devices in the data center may have different capabilities.

SUMMARY

In general, this disclosure describes techniques for determining amounts of data to be forwarded from a switch in a switch fabric to upstream switches in the switch fabric based on available bandwidths for the upstream switches. In particular, the switch may determine a ratio between available bandwidths for the upstream switches (i.e., the available bandwidths from the upstream switches toward a destination for network traffic) and forward amounts of data to the upstream switches that correspond to the ratio. The switch may use bandwidth advertisements received from the upstream switches to determine the available bandwidths for the upstream switches.

For example, if the switch is coupled to two upstream switches, one of which has 10 Gigabit Ethernet (GbE) of available bandwidth across one or more paths toward a destination and the other of which has 40 GbE of available bandwidth across one or more other paths toward the destination, the switch determines that the ratio is 1:4. That is, the switch determines the ratio between available upstream bandwidth for one upstream switch and available upstream bandwidth for another upstream switch. Thus, the switch may forward 20% (1/(1+4)) of data to the switch having 10 GbE of available bandwidth and 80% of data to the switch having 40 GbE of available bandwidth. Each switch in an IP fabric may be configured to perform these techniques. Accordingly, switches of the IP fabric may make intelligent determinations that take account of multi-hop bandwidth information to efficiently utilize available bandwidth in the IP fabric.

In one example, a method includes determining, by a first network device of a plurality of network devices forming an Internet protocol (IP) fabric, available bandwidths for at least a third network device and a fourth network device of the plurality of network devices to which the first network device is communicatively coupled, wherein the third network device and the fourth network device are between the first network device and a second network device of the plurality of network devices, determining a ratio between the available bandwidths for the third network device and the fourth network device, and forwarding data toward the second network device according to the ratio, such that a ratio between amounts of the data forwarded to the third network device and the fourth network device corresponds to the ratio between the available bandwidths.

In another example, a first network device of a plurality of network devices forming an Internet protocol (IP) fabric comprises a plurality of network interfaces communicatively coupled to at least a third network device and a fourth network device of the plurality of network devices between the first network device and a second network device of the plurality of network devices, and one or more hardware-based processors configured to determine available bandwidths for the third network device and the fourth network device, determine a ratio between the available bandwidths for the third network device and the fourth network device, and forward data toward the second network device according to the ratio, such that a ratio between amounts of the data forwarded to the third network device and the fourth network device corresponds to the ratio between the available bandwidths.

In another example, a system includes a plurality of network devices forming an Internet protocol (IP) fabric, the plurality of network devices including a first network device, a second network device, a third network device, and a fourth network device, wherein the first network device is communicatively coupled to the third network device and the fourth network device, and wherein the third network device and the fourth network device are between the first network device and the second network device, wherein the first network device is configured to determine available bandwidths for the third network device and the fourth network device, determine a ratio between the available bandwidths for the third network device and the fourth network device, and forward data toward the second network device according to the ratio, such that a ratio between amounts of the data forwarded to the third network device and the fourth network device corresponds to the ratio between the available bandwidths.

In another example, a computer-readable medium, such as a computer-readable storage medium has stored thereon instructions that cause a processor of a first network device of a plurality of network devices forming an Internet protocol (IP) fabric to determine available bandwidths for at least a third network device and a fourth network device of the plurality of network devices to which the first network device is communicatively coupled, wherein the third network device and the fourth network device are between the first network device and a second network device of the plurality of network devices, determine a ratio between the available bandwidths for the third network device and the fourth network device, and forward data toward the second network device according to the ratio, such that a ratio between amounts of the data forwarded to the third network device and the fourth network device corresponds to the ratio between the available bandwidths.

The details of one or more examples are set forth in the accompanying drawings and the description below. Other features, objects, and advantages will be apparent from the description and drawings, and from the claims.

DETAILED DESCRIPTION

Figure 1:
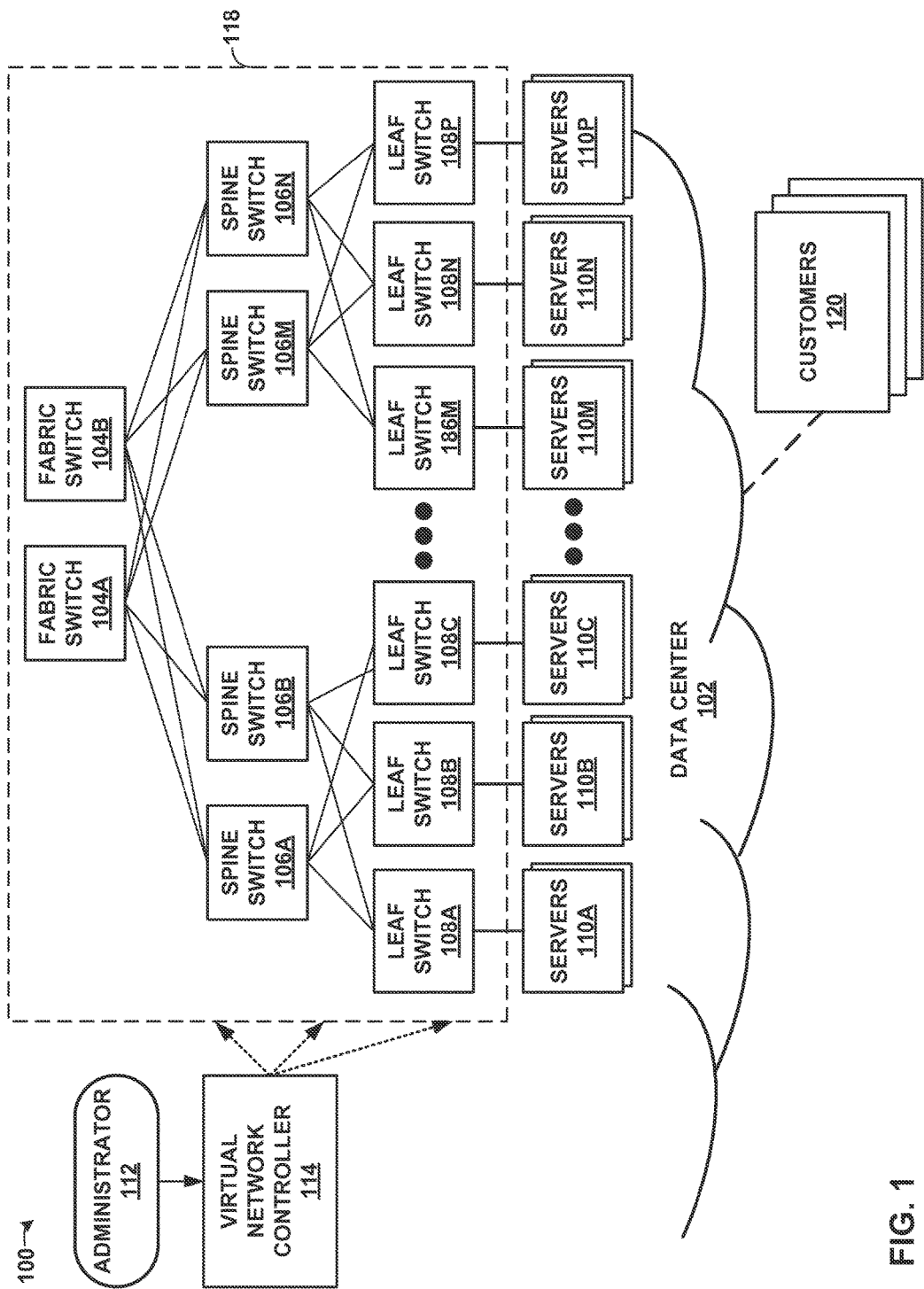
FIG. 1 is a block diagram illustrating an example network 100 including a data center in which examples of the techniques described herein may be implemented.

FIG. 1 is a block diagram illustrating an example network 100 including a data center 102 in which examples of the techniques described herein may be implemented. In general, data center 102 provides an operating environment for applications and services for customers 120 coupled to the data center, e.g., by a service provider network (not shown). Data center 102 may, for example, host infrastructure equipment, such as networking and storage systems, redundant power supplies, and environmental controls. In some examples, a service provider network that couples customers 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example of FIG. 1, data center 102 may be a facility that provides network services for customers 120. Customers 120 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 102 may be individual network servers, network peers, or otherwise. In some examples, data center 102 is an enterprise or internal data center.

In this example, data center 102 includes a set of storage systems and application servers 110A-110N (servers 110) interconnected via Internet protocol (IP) fabric 118, which may comprise a switch fabric provided by one or more tiers of physical network switches and routers. In the example of FIG. 1, IP fabric 118 includes three tiers of switches: fabric switches 104A-104N (fabric switches 104), spine switches 106A-106N (spine switches 106), and leaf switches 108A-108C. It should be understood that other topologies may be used in other examples. Servers 110 provide execution and storage environments for applications and data associated with customers 120 and may be physical servers, virtual machines or combinations thereof.

In general, IP fabric 118 represents layer two (L2) and layer three (L3) switching and routing components that provide point-to-point connectivity between servers 110. In one example, IP fabric 118 comprises a set of interconnected, high-performance yet off-the-shelf packet-based routers and switches that implement industry standard protocols. In one example, IP fabric 118 may comprise off-the-shelf components that provide Internet Protocol (IP) over an Ethernet (IPoE) point-to-point connectivity.

In FIG. 1, virtual network controller 114 provides a high-level controller for configuring and managing routing and switching infrastructure of data center 102. Virtual network controller 114 may represent, for example, a software defined network (SDN) controller that communicates and manages the devices of data center 102 using an SDN protocol, such as the OpenFlow protocol. Additional details regarding OpenFlow are found in "OpenFlow Switch Specification version 1.1.0", OpenFlow Consortium, February 2011, which is incorporated by reference herein. In addition, controller 114 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Virtual network controller 114 provides a logically—and in some cases, physically—centralized controller for facilitating operation of one or more virtual networks within data center 102 in accordance with examples of this disclosure. In some examples, virtual network controller 114 may operate in response to configuration input received from network administrator 112. Additional information regarding virtual network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within IP fabric 118, such as packet flows between servers 110, can traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As shown in the example of FIG. 1, each of fabric switches 104 is communicatively coupled to each of spine switches 106 in IP fabric 118. Spine switches 106A and 106B are coupled to each of leaf switches 108A-108C, while spine switches 106M and 106N are coupled to each of leaf switches 108M-108P. Multi-stage data center networks, such as Clos or networks with a so-called "fat tree" topology, are being used extensively in modern data centers for high performance and resiliency. Multi-pathing in these fat tree networks renders their use beneficial.

As one example, Juniper's Virtual Chassis Fabric (VCF), in addition to allowing a multi-staged Clos network to be managed as a single device, also allows path weights to reflect and react to path's end-to-end bandwidth. Such a capability is termed "smart trunks" in VCF. These extra "smarts" are enabled by the Virtual Chassis Control Protocol (VCCP) that runs inside a VCF to provide globally optimized weights on the multi-paths. An IP fabric, such as IP fabric 118, is a loosely-federated multi-stage network where all nodes of the fabric run standard IP routing protocols. The routing protocols, which may include, for example, external border gateway protocol (EBGP), include all paths between leaf switches 108 in IP fabric 118, and equal cost multipath (ECMP) is used to utilize all paths. For instance, there are eight paths between any two leaf switches 108 in IP fabric 118, assuming each path traverses spine switches 106 twice and one of fabric switches 104.

Conventionally, BGP routing protocols do not have a mechanism to propagate link bandwidth to allow the calculation of end-to-end path bandwidth utilization. To illustrate the issue, when the link between fabric switch 104B and spine switch 106N is reduced by half, the hash weight on spine switch 106A ideally should be adjusted so that its hash weight of the link between fabric switch 104B and spine switch 106N is also reduced by half. But, in the conventional implementation of IP Fabric, the ECMP weight is not adjusted accordingly to avoid unnecessary congestions along the fabric path.

Unequal bandwidth ECMP based on advertised link bandwidth information is described in Mohapatra et al., "BGP Link Bandwidth Extended Community," draft-ietf-idr-link-bandwidth-06.txt, Network Working Group, Jan. 22, 2013, available at tools.ietf.org/html/draft-ietf-idr-link-bandwidth-06, on Link Bandwidth Extended Community. However, this extended community is defined as "non-transitive," and hence, it does not have the capability to allow a multi-hop IP Fabric to discover proper path bandwidth.

The techniques of this disclosure, however, include a mechanism to achieve adaptive hash weight based on multi-hop path bandwidth ratios so as to avoid improper weight allocation and congestions.

Hanks, "White Paper: CLOS IP Fabrics with QFX5100 Switches," 2014, available at www.juniper.net/us/en/local/pdf/whitepapers/2000565-en.pdf, describes an example of using Juniper's Junos EBGP multiple-AS (autonomous system) option for multipath to allow EBGP to build multipaths between all nodes in an IP Fabric. BGP includes techniques for advertising link bandwidths, which can inform BGP neighbors about the bandwidths of advertised routes. In particular, BGP includes an extended community attribute, which may be used to distribute bandwidth information for links. The link bandwidth extended community can be used by BGP neighbors to form multipaths with unequal bandwidth, e.g., as described in Gredler et al., "North-Bound Distribution of Link-State and TE Information using BGP," draft-ietf-idr-ls-distribution-06," Inter-Domain Routing, Internet-Draft, Sep. 16, 2014, available at http://tools.ietf.org/html/draft-ietf-idr-ls-distribution-06.

However, the current link bandwidth extended community, as defined in Mohapatra et al., "BGP Link Bandwidth Extended Community," draft-ietf-idr-link-bandwidth-06.txt, Network Working Group, Internet-Draft, Jan. 22, 2013, available at tools.ietf.org/html/draft-ietf-idr-link-bandwidth-06, is non-transitive, and no rules have been defined as to how to propagate received link bandwidth extended community attributes. Hence, if there were a multipath between, e.g., leaf switch 108A and leaf switch 108P, and bandwidth information were distributed according to Mohapatra, the bandwidth information for the link between spine switch 106N and leaf switch 108P would be lost at leaf switch 108A.

This disclosure describes a mechanism whereby network devices (e.g., BGPAS devices, such as fabric switches 104, spine switches 106, and leaf switches 108) combine received bandwidth attributes of different paths and propagate this information to other neighbors of the BGP AS. In this manner, the devices are able to derive end-to-end path bandwidth, in a multi-hop network, from one AS to a non-adjacent AS.

In particular, according to the techniques of this disclosure, assume that fabric switch 104B (representing an example of one AS) receives link bandwidth from, e.g., spine switch 106N. Fabric switch 104B propagates this link bandwidth information to multiple other ASes with different attribute values for links to the other ASes (e.g., to spine switch 106A and spine switch 106B). In one example, the following rules for calculating and propagating the path bandwidth attribute:

1. An AS (e.g., one of the switches of IP fabric 118) aggregates received a path bandwidth extended community, then exports the path bandwidth extended community attribute to all other neighbors. For example, fabric switch 104B may receive a path bandwidth extended community attribute from spine switches 106M and 106N, then aggregate these attribute values and distribute the aggregated value as a path bandwidth extended community to spine switches 106A and 106B.
2. When advertising received link bandwidth information, a network device modifies the advertised link bandwidth information so that it is the minimum of the received bandwidth and link bandwidth on the link with the neighbor AS. For example:
   a. Fabric switch 104B may advertise to spine switch 106A the minimum of:
      i. The aggregated bandwidth for links to spine switches 106M, 106N, and
      ii. The link bandwidth for the link to spine switch 106A.
   b. Fabric switch 104B may advertise to spine switch 106B the minimum of:
      i. The aggregated bandwidth for links to spine switches 106M, 106N, and
      ii. The link bandwidth for the link to spine switch 106B.

As can be seen, with propagation, the once simple and non-transitive extended community of link bandwidth, explodes into multiple attributes with a multiplicity of N, where N is the number of neighborship for a network device advertising link bandwidths.

Due to the existence of multiple paths, any AS will receive multiple copies of path bandwidth attributes from the same origin AS. For example, spine switch 106A receives bandwidth advertisements from fabric switch 104A and fabric switch 104B.

According to the techniques of this disclosure, network devices in IP fabric 118 may use the following rule to derive proper weights in a multipath ECMP: when a prefix is attached to multiple path bandwidth attributes, each representing a different next-hop network device, then its next-hop shall weight the links proportionally to the path bandwidth attributes from the network device.

To effectively implement the above mechanisms, there are two options:

1. The same Link Bandwidth extended community as defined can be used as a transitive extended community. The propagation rules may be as defined above.
2. Define a new transitive Path Bandwidth extended community. The propagation rules may be as defined below.

The network devices of IP fabric 118 may be configured to use a Path Bandwidth BGP extended community in accordance with the techniques of this disclosure. The Path Bandwidth BGP extended community provides end-to-end visibility in an IP fabric, so that ingress network devices can derive packet forwarding "hints" from the link bandwidth and successfully perform unequal cost multi-pathing (WCMP).

In the example of FIG. 1, assume that the various links that interconnect leaf switches 108, spine switches 106, and fabric switches 104 have different link speeds (e.g., 10 Gbe, 40 GbE, and 100 GbE). Depending on the design and state of the IP Fabric, there could be scenarios where true ECMP from source to destination would not be optimal. IP Fabric 118 of FIG. 1 is an example of a standard 5-stage Clos fabric. The top tier is called the "fabric." The next tier is the "spine." The final tier is the "leaf."

Upgrades to networks for companies tend to happen in an incremental fashion. Thus, switches (or other network devices) may be upgraded one at a time. During such migrations, the link speed and total capacity of the IP fabric could be unbalanced. Thus, the network devices of IP fabric 118 may be configured to use the techniques of this disclosure related to a Path Bandwidth extended community to distribute path bandwidth information, to balance network traffic efficiently among the various network devices. In particular, the network devices of IP fabric 118 may aggregate the link bandwidth for links to "upstream" network devices, and then distribute this aggregated link bandwidth to network devices that are "downstream."

For example, suppose fabric switch 104B has a 100 GbE link to spine switch 106N and a 40 GbE link to spine switch 106M. Fabric switch 104B may advertise a total available bandwidth of 140 GbE to spine switches 106A, 106B. That is, the advertisement would indicate that a total bandwidth of 140 GbE is available toward (that is, along path(s) to) servers 110M-110P. Similarly, assume that fabric switch 104A has an aggregated total available bandwidth of 80 GbE (e.g., two 40 GbE links to spine switches 106M, 106N). In this case, fabric switch 104A would advertise 80 GbE of available link bandwidth to spine switches 106A, 106B. That is, the advertisement would indicate that a total of 80 GbE is available toward (that is, along paths to) servers 110M-110P.

Spine switches 106A, 106B may determine a ratio between available bandwidths for the "upstream" network devices, which in the example of FIG. 1 are fabric switches 104A, 104B. In particular, as noted above, the available bandwidths correspond to upstream bandwidths relative to fabric switches 104A, 104B, i.e., along paths to reach servers 110M-110P. For instance, spine switch 106A may determine that the ratio between available bandwidths for fabric switches 104A, 104B is 80:140, or 4:7. Thus, for every four units of data (e.g., packets, bytes, or the like) sent to fabric switch 104A, spine switch 106A may send 7 units of data to fabric switch 104B. Thus, assuming spine switch 106A receives 100 packets, spine switch 106A may forward 36 packets to fabric switch 104A, and 64 packets to fabric switch 104B.

Furthermore, in some examples, network devices of IP fabric 118 may periodically account for utilization of bandwidths of the links when determining amounts of data to forward upstream. For instance, assume again that fabric switch 104A has an aggregate available bandwidth of 80 GbE and that fabric switch 104B has an aggregate available bandwidth of 140 GbE. Assume further that 50% of the 140 GbE of bandwidth for fabric switch 104B (that is, 70 GbE) is currently being utilized, and none of the 80 GbE of bandwidth for fabric switch 104A is currently being utilized. In this example, the ratio based on available bandwidth for the links would be 8:7. Thus, if spine switch 106A were to receive 100 packets, spine switch 106A may forward 53 of the packets to fabric switch 104A and 47 of the packets to fabric switch 104B. The network devices of IP fabric 118 may distribute utilization information in substantially the same manner as bandwidth availability information. For example, the network devices may subtract the utilized bandwidth from the total available bandwidth, and then advertise the remaining available bandwidth in Path Bandwidth extended community attributes.

Figure 2:
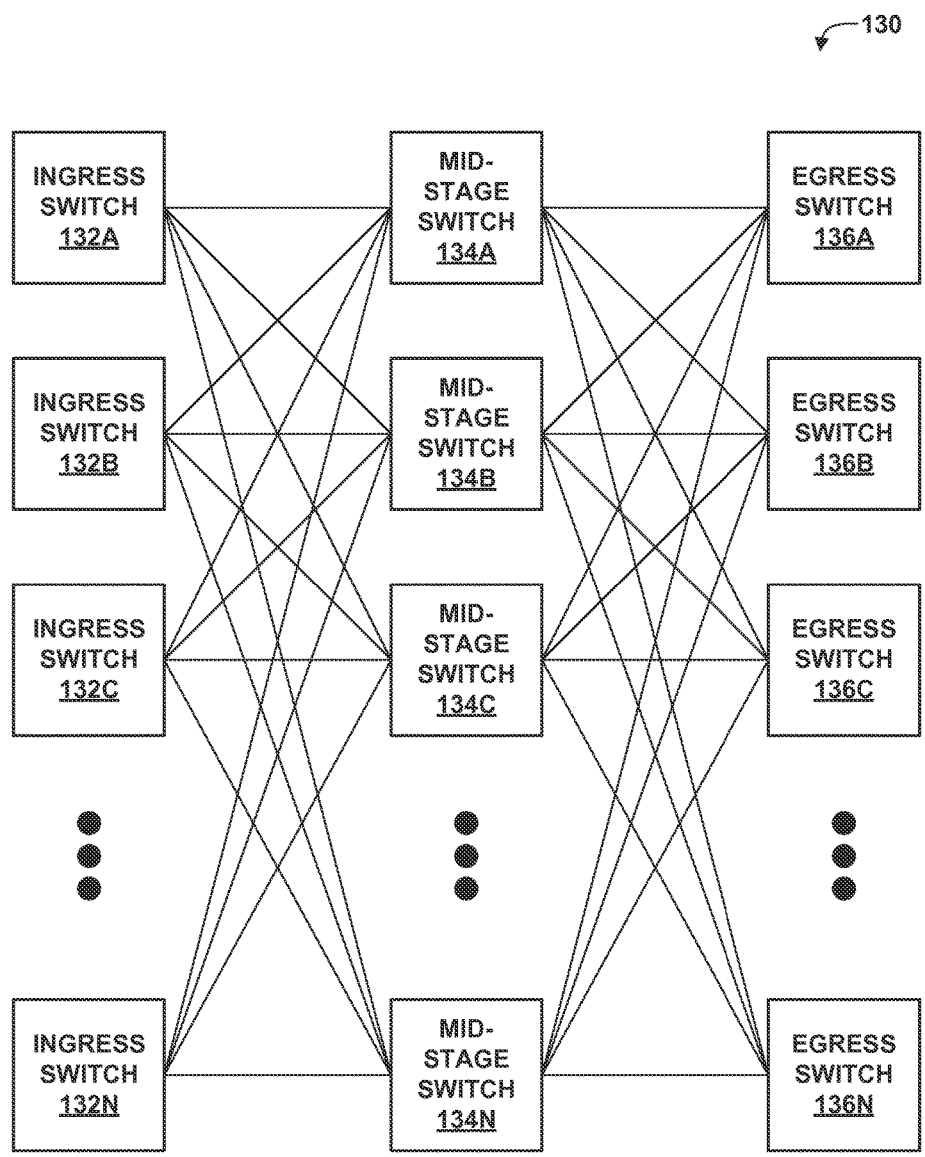
FIG. 2 is a block diagram illustrating an example Clos network.

FIG. 2 is a block diagram illustrating an example Clos network 130. Clos network 130, or a similar Clos network, may be used in place of IP fabric 118 of FIG. 1. Clos network 130 includes three stages of switches: ingress switches 132A-132N (ingress switches 132), mid-stage switches 134A-134N (mid-stage switches 134), and egress switches 136A-136N (egress switches 136). Although the letter "N" is used to designate a variable number for each of ingress switches 132, mid-stage switches 134, and egress switches 136, it should be understood that the number of switches included in each stage is not necessarily the same. That is, there may be different numbers of ingress switches 132, mid-stage switches 134, and egress switches 136. Furthermore, although Clos network 130 includes three stages, it should be understood that a general Clos network may include any number of stages.

Figure 3A:
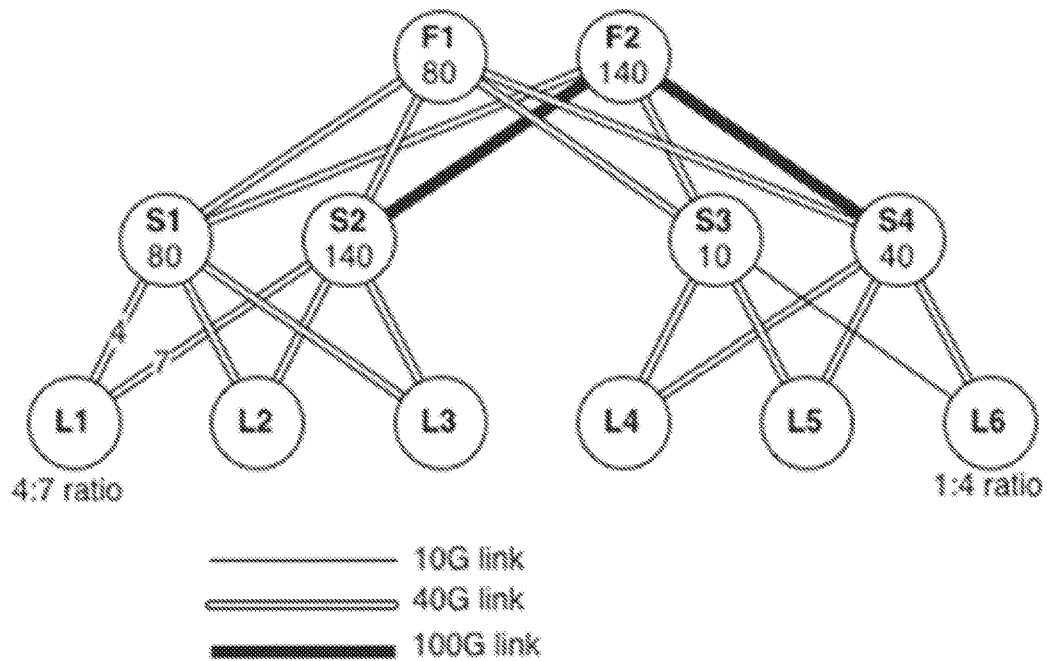
FIGS. 3A and 3B are conceptual diagrams illustrating an example network in which the techniques of this disclosure are performed.
Figure 3B:
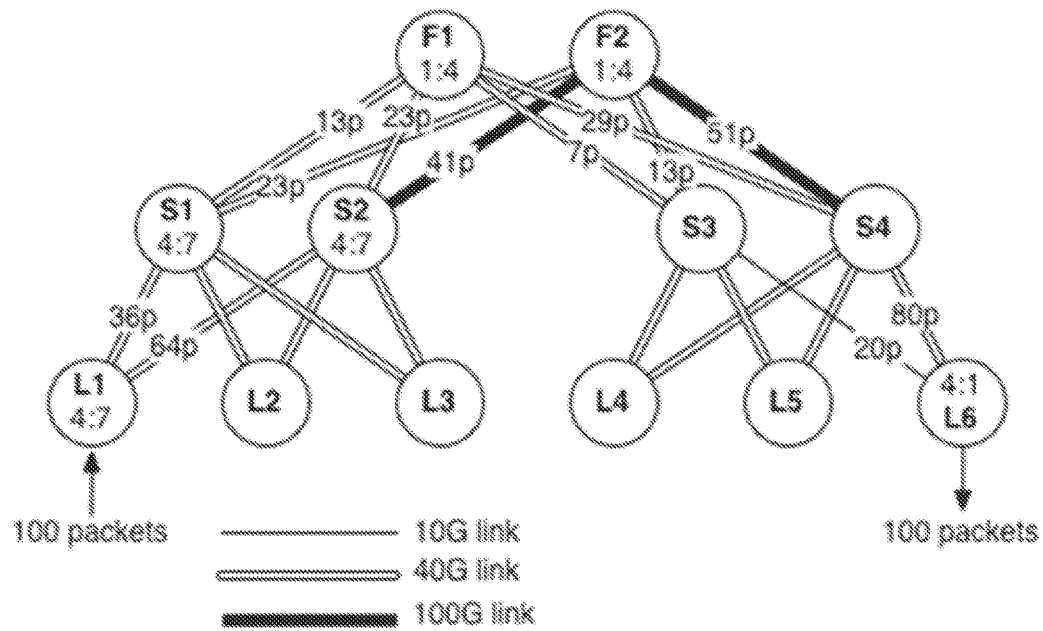

FIGS. 3A and 3B are conceptual diagrams illustrating an example network in which the techniques of this disclosure are performed. In particular, in the example of FIGS. 3A and 3B, a network of switches (arranged as a five-stage Clos network) is interconnected by links of various speeds. Dark lines represent 100 gigabit Ethernet (G) links, double lines represent 40G links, and single, thin lines represent 10G links. The network includes three tiers of switches: a top tier labeled "F" for fabric, an intermediate tier labeled "S" for spine, and a lower tier labeled "L" for leaf. As an example, L1-L6 may correspond to respective leaf switches 1086 of FIG. 1, S1-S4 may correspond to respective spine switches 106 of FIG. 1, and F1, F2 may correspond to respective fabric switches 104 of FIG. 1.

In this example, L1-L3 are connected to S1 and S2 by 40G links, S1 is connected to F1 and F2 by 40G links, S2 is connected to F1 by a 40G link and to F2 by a 100G link. F1 is connected to S3 and S4 by 40G links, and F2 is connected to S3 by a 40G link and to S4 by a 100G link. S3 and S4 are connected to L4 and L5 by 40G links. S3 is connected to L6 by a 10G link, but S4 is connected to L6 by a 40G link.

When traffic is sent from one of L1-L3 to one of L4-L6, the shortest path is always four hops away. Depending on how the traffic is hashed, some nodes have more or less bandwidth than others. The following represent example paths for sending traffic from L1 to L6:

L1→S1→F1→S3→L6
L1→S2→F2→S4→L6

Of course, many other paths are also possible. The first example listed above reaches a bottleneck for the link from S3 to L6, due to the 10G link. The second example listed above limits overall throughput to 40G, as the slowest link in the path is 40G. However, simply comparing the slowest links when comparing paths would not necessarily yield the best results.

Instead, each network device between L1 and L6 may be configured to make independent decisions on how to forward traffic, based on available upstream bandwidths. For example, S1 may advertise available upstream bandwidth of 80G to L1, while S2 may advertise available upstream bandwidth of 140 to L1. Thus, S1 may determine a ratio of 4:7 (which is 80:140 reduced) between the available bandwidths between S1 and S2. Accordingly, S1 may forward units of data (e.g., packets, bytes, or the like) to S1 and S2 according to this ratio. For examples, L1 may forward 4/11 units of data (36%) to S1 and 7/11 units of data (64%) to S2. These techniques may yield a more optimal bandwidth utilization than, for example, standard ECMP, which would provide inefficient packet forwarding from L1 to L6, relative to the techniques of this disclosure.

As discussed above, S3 and S4 determine available bandwidths from links to L4-L6 as shown in FIGS. 3A and 3B, and advertise these available bandwidths, e.g., in BGP extended community attributes. F1 and F2 receive these advertisements and determine available bandwidths to L4-L6 based on the respective links to S3 and S4 and the advertisements from S3 and S4. Thus, for example, S3 determines that available bandwidth to reach L6 is 10G, but S4 determines that available bandwidth to reach L6 is 40G. Similarly, F1 determines that available bandwidth to reach both S3 and S4 is 40G. However, F2 determines that available bandwidth to reach S3 is 40G, but available bandwidth to reach S4 is 100G. Likewise, S1 determines that available bandwidth to reach both F1 and F2 is 40G, while S2 determines that available bandwidth to reach F1 is 40G, but is 100G to reach F2.

Assume that both S1 and S2 have an extended BGP community and export the total bandwidth information to L1 in a BGP extended community attribute. As a result, L1 has additional link bandwidth context, in accordance with the techniques of this disclosure. In particular, L1 receives information that S1 can handle 80G of traffic and S2 can handle 140G of traffic destined to L6. L1 can now calculate a ratio to be used with unequal cost multi-pathing. In this example the ratio would be 4:7. That is, 80:140 (the ratio of available bandwidth between S1 and S2) reduces to 4:7. As such, L1 will send 36.36% (4/11) of all packets to S1 and send 63.63% (7/11) of traffic to S2.

Each switch in the network of FIGS. 3A and 3B may make similar determinations. That is, each switch may perform a similar function, such that allocations of received packets according to ratios of available bandwidth may be performed by each switch in the network. To calculate the proper ratios by taking into the account of the overall link bandwidth between each of the nodes, each switch calculates its total available uplink bandwidth to reach a prefix in question and updates the BGP extended community for the prefix in question with a value that is equal to the total available bandwidth.

FIG. 3B illustrates an example in which 100 packets are sent from L1 to L6 according to the techniques of this disclosure. Each of the switches of the network determines ratios of data to be sent to other switches along corresponding paths to L6. Thus, as shown in the example of FIG. 3B:

1. L1 determines a ratio of 4:7 between the available bandwidths for S1 and S2, because S1 has a total capacity of 80G, and S2 has a total capacity of 140G. Accordingly, L1 sends 36 packets to S1 and 64 packets to S2.
2. S1 receives 36 packets from L1. S1 determines that F1 has available bandwidth of 80G and that F2 has available bandwidth of 140G. Thus, S1 determines that the ratio of available bandwidth between F1 and F2 is 4:7. Accordingly, S1 forwards 13 packets to F1 and 23 packets to F2.
3. S2 receives 64 packets from L1. S2 determines that F1 has available bandwidth of 80G and that F2 has available bandwidth of 140G. Thus, S1 determines that the ratio of available bandwidth between F1 and F2 is 4:7. Accordingly, S2 forwards 23 packets to F1 and 41 packets to F2.
4. F1 receives 13 packets from S1 and 23 packets from S2, for a total of 36 packets. F1 determines that S3 has 10G of available bandwidth to forward packets to L6 and that S4 has 40G of available bandwidth to forward packets to L6. Accordingly, F1 determines that the ratio of available bandwidth between S3 and S4 is 1:4. Thus, F1 forwards 9 packets to S3 and 29 packets to S4.
5. F2 receives 23 packets from S1 and 41 packets from S2, for a total of 64 packets. F2 determines that S3 has 10G of available bandwidth to forward packets to L6 and that S4 has 40G of available bandwidth to forward packets to L6. Accordingly, F1 determines that the ratio of available bandwidth between S3 and S4 is 1:4. Thus, F1 forwards 13 packets to S3 and 51 packets to S4.
6. S3 receives 20 packets total: 7 from F1 and 13 from F2. Thus, S3 forwards 20 packets to L6.
7. S4 receives 80 packets total: 29 from F1 and 51 from F2. Thus, S4 forwards 80 packets to L6.
8. L6 receives 100 packets total: 20 from S3 and 80 from S4.

With each switch in the IP Fabric configured to make independent forward decisions based on the available upstream bandwidth, traffic can be forwarded through the IP Fabric and make the most efficient use of slower and faster links. For example, compare the amount of traffic on the link between S2 and F2 (41 packets) relative to S1 and F2 (23 packets). This is because both S2 and F2 have more capacity to forward traffic destined to L6, compared to S1 and F1.

The pseducode below represents an example implementation of a function for calculating the value of IP Fabric bandwidth in an extended BGP community according to the techniques of this disclosure:

FOR EACH PREFIX IN RIB
AGGREGATE_BANDWIDTH=0
FOR EACH ECMP_NEXT_HOP IN FIB
  AGGREGATE_BANDWIDTH+=ECMP_
    NEXT_HOP→LINK_BANDWIDTH
PREFIX→IP_FABRIC_COMMUNITY=
  AGGREGATE_BANDWIDTH
FOR EACH BGP_NEIGHBOR
  EXPORT PREFIX→IP_FABRIC_COMMUNITY

That is, as shown in the pseudocode, each switch calculates the total amount of uplink bandwidth for each prefix and advertises this uplink bandwidth to the downstream switches using an extended BGP community, e.g., called IP Fabric Bandwidth. Each switch can then use the IP Fabric Bandwidth extended BGP community to create local forwarding ratios for each of its uplink switches. The end result is that traffic can be forwarded in the correct ratio end-to-end to make most efficient use of links with different bandwidth speeds.

Using substantially the same algorithm, switches in an IP fabric can take into account utilization of the available bandwidth. For example, assume that the link between F1 and S3 is currently being utilized at 75%. Typically F1 would advertise to S1 and S2 a total capacity of 80 GbE. In addition F2 would typically advertise to S1 and S2 a total capacity of 140 GbE. If the switches take into account that the link between F1 and S3 is currently being utilized at 75%, the switches can decrement the currently used bandwidth from the available bandwidth. For example, if the switches take into account currently utilized bandwidth between F1 and S3, F1 would advertise to S1 and S2 a total of 50 GbE. This is because the link between F1 and S3 is currently utilized at 75%, and only 10 GbE of 40 GbE is available. Then, S1 and S2 can modify their local traffic ratios from 4:7 to 50:140, or 5:14. The frequency with which BGP updates the rolling average of bandwidth utilization may be user configurable. A default recommendation of every 5 minutes should minimize oscillations in the network due to transient traffic spikes. Example pseudo code to incorporate bandwidth utilization is as follows:

```
FOR EACH PREFIX IN RIB
   AGGREGATE_BANDWIDTH=0
   FOR EACH ECMP_NEXT_HOP IN FIB
      AGGREGATE_BANDWIDTH+=ECMP_
         NEXT_HOP→LINK_BANDWIDTH
      AGGREGATE_BANDWIDTH-=ECMP_
         NEXT_HOP→CURRENT_UTILIZATION
   PREFIX→IP_FABRIC_COMMUNITY=
      AGGREGATE_ BANDWIDTH
   FOR EACH BGP_NEIGBHOR
      EXPORT PREFIX→IP_FABRIC_COMMUNITY
```

In this manner, by using an IP Fabric Bandwidth BGP extended community according to the techniques of this disclosure, traffic can be properly distributed to efficiently utilize both the available bandwidth and link bandwidth. Using substantially the same aggregate bandwidth algorithm, switches in an IP fabric can easily add a second metric of available bandwidth by simply subtracting the currently utilized bandwidth from the aggregate bandwidth.

Likewise, the various examples described above represent examples of a technique for allowing an IP Fabric running an IP routing protocol, such as BGP, to make smarter decisions on ECMP weights, such that multi-hop path bandwidth information is taken into consideration so that fabric congestion may be minimized when link bandwidths are not a metric. This example technique generally includes three elements: 1) an IP Fabric Bandwidth attribute propagation mechanism on top of established routing protocols, such as BGP; 2) an IP Fabric Bandwidth propagation mechanism that allows all nodes in an IP Fabric to establish path bandwidth data to every other node in the Fabric, hence a path-bandwidth weighted ECMP can be formed by the routing protocol; and 3) a policy mechanism by which a router's aggregate link bandwidth is automatically advertised to its neighbors.

Figure 4:
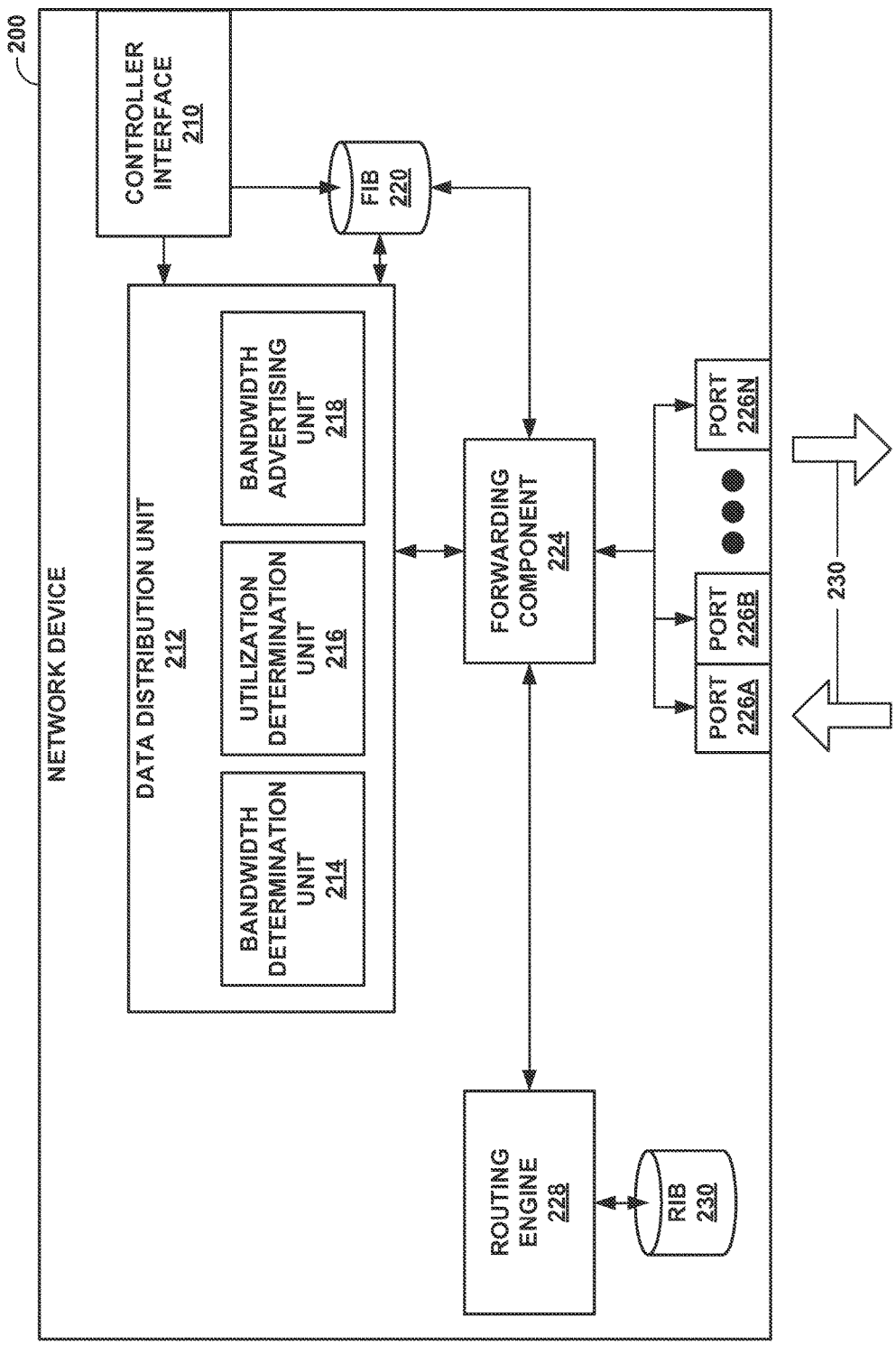
FIG. 4 is a block diagram illustrating an example network device that may be configured to perform the techniques of this disclosure.

FIG. 4 is a block diagram illustrating an example network device 200 that may be configured to perform the techniques of this disclosure. Various types of devices may be implemented to perform the techniques of network device described below, such as routers or switches of a software defined network (SDN). For purposes of example, network device 200 is shown as a router including routing engine 228 and routing information base (RIB) 230.

In general, routing engine 228 executes one or more routing protocols, such as border gateway protocol (BGP), to discover routes through a network, e.g., IP fabric 118 (FIG. 1). Routing engine 228 stores discovered routes in RIB 230. Routing engine 228 also programs elements of a forwarding plane, such as forwarding information base (FIB) 220, to cause forwarding component 224 to forward data via ports 226 that are coupled to next hops of a route toward a destination.

Network device 200 also includes controller interface 210, data distribution unit 212, FIB 220, forwarding component 224, and physical ports 226A-226N (ports 226). Controller interface 210 acts as an interface to virtual network controller 114 (FIG. 1). Virtual network controller 114 may provide configuration data to network device 200 via controller interface 210. For example, the received configuration data may define physical ports 226 of network device 200 and devices of IP fabric 118 (e.g., leaf switches 108, spine switches 106, and/or fabric switches 104) to which the physical ports are connected.

FIB 220 generally stores information that maps packets to ports 226 of network device 200. FIB 220 may be configured by network device 200 and/or virtual network controller 114. Network device 200 also includes forwarding component 224. In the example of FIG. 4, forwarding component 224 receives packets of a packet flow, such as packet flow 230, via one of ports 226.

After receiving packets of one or more packet flows, such as packet flow 230, forwarding component 224 determines how to forward the packets according to FIB 220. If the packets are destined for network device 200 itself, forwarding component 224 may forward the packets to an internal unit of network device 200, such as data distribution unit 212. Alternatively, if the packets are to be forwarded to another device, e.g., another network device of IP fabric 118 (FIG. 1), FIB 220 indicates one of ports 226 by which to forward the packet.

As noted above, in some examples, a received packet is destined for network device 200 itself. For example, network device 200 receives packets that advertise bandwidth availability for links to other network devices of IP fabric 118, in accordance with the techniques of this disclosure. Forwarding component 224 forwards such packets to data distribution unit 212.

Data distribution unit 212 includes bandwidth determination unit 214, utilization unit 216, and bandwidth advertising unit 218. In general, data distribution unit 212 receives and distributes packets that advertise available bandwidths for various links of IP fabric 118 by which network device 200 is coupled to other network devices of IP fabric 118. Thus, received packets may include a Path Bandwidth extended community for BGP. BGP extended communities are described in Sangli et al., "BGP Extended Communities Attribute," Network Working Group, RFC 4360, February 2006, available at tools.ietf.org/html/rfc4360. An attribute of the Path Bandwidth extended community indicates available bandwidth, representing an aggregation of available bandwidth for an upstream network device of IP fabric 118 to which network device 200 is communicatively coupled via one of ports 226. Thus, bandwidth determination unit 214 determines available bandwidth for each of the upstream network devices of IP fabric 118 to which network device 200 is communicatively coupled. In some examples, the information also represents utilization of the bandwidth.

Using this available bandwidth information, data distribution unit 212 determines one or more ratios between available bandwidths for upstream network devices of IP fabric 118. Then, data distribution unit 212 determines allocations of data to be forwarded (e.g., bytes or packets) according to the ratio(s). For example, when a new packet flow, such as packet flow 230, is received, data distribution unit 212 refers to a destination for the new packet flow to determine an endpoint for the packet flow. Data distribution unit 212 then determines each of ports 226 that are coupled to next hops (that is, upstream network devices of IP fabric 118) that lead to the destination. Data distribution unit 212 may further determine a number of packet flows assigned to each of ports 226, and calculate a current ratio of actual traffic being sent to each of ports 226 coupled to such next hops. Data distribution unit 212 may then assign the new packet flow to one of ports 226 that is less than the calculated ratio of available bandwidth (which may take account of utilization of bandwidth).

For example, assume that network device 200 corresponds to spine switch 106A, that port 226A is coupled to fabric switch 104A, and that port 226B is coupled to fabric switch 104B. If the ratio of available bandwidths between fabric switch 104A and fabric switch 104B is 4:7, but the ratio for actual amounts of traffic being sent to fabric switches 104A and 104B is 4:6, data distribution unit 212 may assign the new packet flow to port 226B. That is, data distribution unit 212 may update FIB. 220 such that FIB 220 indicates that the new packet flow is to be forwarded via port 226B.

Utilization determination unit 216 and bandwidth advertising unit 218 jointly send advertisements to downstream network devices of IP fabric 118 indicative of an aggregation of bandwidths of links to upstream network devices of IP fabric 118. Assume for purposes of example that the link attached to port 226A is 40 GbE and that the link attached to port 226B is 100 GbE, and that ports 226A, 226B are coupled to upstream devices of IP fabric 118. Bandwidth advertising unit 218 would aggregate these values and advertise these values to downstream network devices of IP fabric 118. For example, if port 226N is coupled to a downstream device (e.g., if network device 200 represents spine switch 106A, port 226N may be coupled to leaf switch 108A), bandwidth advertising unit 218 may form a packet including a Path Bandwidth extended community attribute indicative of available bandwidth to upstream network devices and cause forwarding component 224 to forward the packet via port 226N.

In some examples, utilization determination unit 216 further determines amounts of available bandwidths of links to upstream network devices that are currently in use. In such examples, bandwidth advertising unit 218 further accounts for the utilization when performing the aggregation. For instance, if a 100 GbE link is 50% utilized as determined by utilization determination unit 216, bandwidth advertising unit 218 may treat that link as only having 50 GbE available when performing the aggregation discussed above.

Data distribution unit 212 and the various components thereof may be implemented in in various ways. For example, the functionality attributed to data distribution unit 212 may be implemented in hardware, software, and/or firmware. It should be understood that when implemented in software or firmware, requisite hardware would also be provided, e.g., a memory to store instructions for the software/firmware and one or more processors to execute the instructions. In general, a "processor" refers to any of a variety of processing units or processing circuitry, such as a microprocessor, an application-specific integrated circuit (ASIC), a digital signal processor (DSP), a field programmable gate array (FPGA), or the like. When implemented in hardware, the functionality of data distribution unit 212 may be implemented in a single processor or any combination of one or more various types of processors.

In this manner, network device 200 represents an example of a first network device of a plurality of network devices forming an IP fabric. In this example, the first network device includes a plurality of network interfaces (e.g., ports 226) communicatively coupled to at least a third network device and a fourth network device of the plurality of network devices between the first network device and a second network device of the plurality of network devices. In this example, the first network device further includes one or more hardware-based processors (e.g., data distribution unit 212) configured to determine available bandwidths for the third network device and the fourth network device, determine a ratio between the available bandwidths for the third network device and the fourth network device, and forward data toward the second network device according to the ratio, such that a ratio between amounts of the data forwarded to the third network device and the fourth network device corresponds to the ratio between the available bandwidths.

Figure 5:
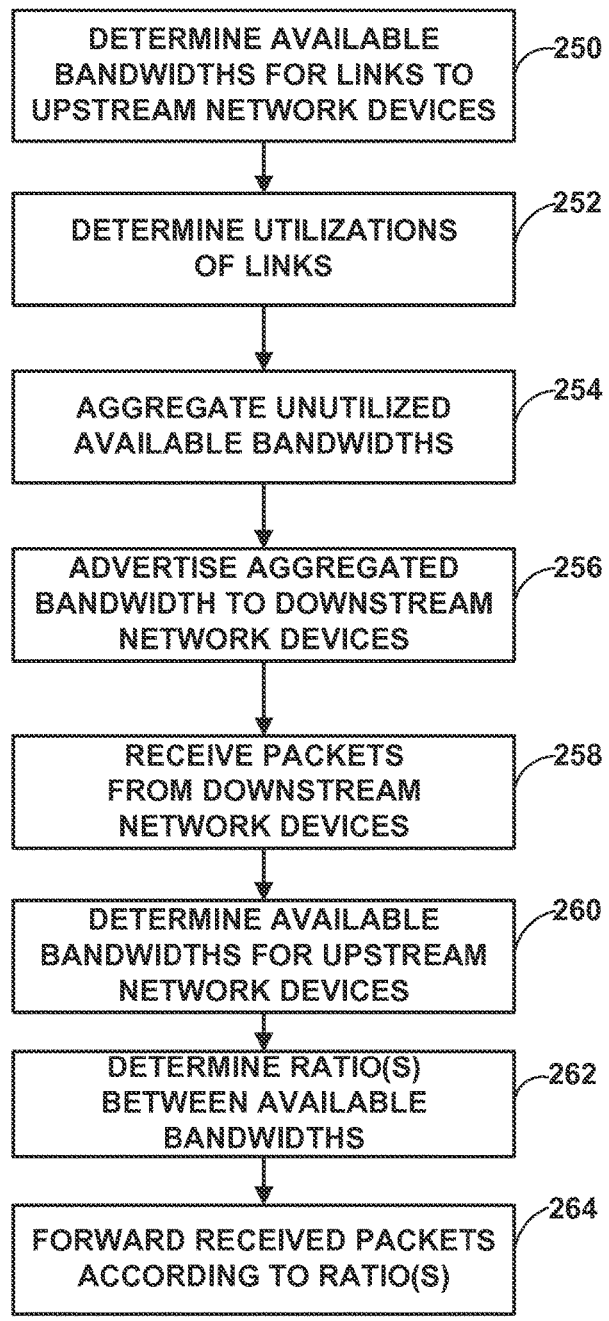
FIG. 5 is a flowchart illustrating an example method for forwarding packets according to a ratio of available upstream bandwidth in an Internet protocol (IP) fabric according to the techniques of this disclosure.

FIG. 5 is a flowchart illustrating an example method for forwarding packets according to a ratio of available upstream bandwidth in an IP fabric according to the techniques of this disclosure. The method of FIG. 5 is explained with respect to network device 200 of FIG. 4.

However, it should be understood that other network devices may perform this or a substantially similar method. For instance, a network device (such as a router or switch) that represents an autonomous system (AS) within an IP fabric may be configured to perform the method of FIG. 5. Moreover, the steps of the method of FIG. 5 need not necessarily be performed in the order shown. That is, the steps may be performed in a different order, and some steps may be performed in parallel.

Initially, bandwidth advertising unit 218 of network device 200 determines available bandwidths for links to upstream network devices (250). Utilization determination unit 216 may also determine utilization of the links (252), that is, amounts of the bandwidths for the links that are currently being utilized. Bandwidth advertising unit 218 then aggregates the (unutilized) available bandwidths (254) and advertises the aggregated bandwidth to downstream network devices (256), e.g., via ports 226 that are coupled to downstream network devices. For example, bandwidth advertising unit 218 may form a one or more packets including a path advertisement according to BGP, the path advertisement including a Path Bandwidth extended community attribute, which indicates the aggregate bandwidth. The path advertisement may be a BGP UPDATE.

The downstream network devices may use this information to determine how to allocate traffic to upstream network devices, which include network device 200. Thus, network device 200 may receive packets from downstream network devices (258), e.g., via ports 226. Bandwidth determination unit 214 also determines available bandwidths for upstream network devices (260). For example, bandwidth determination unit 214 may receive BGP Path Bandwidth extended community attributes from the upstream network devices representative of the available bandwidths for the corresponding upstream network devices.

Data distribution unit 212 then determines one or more ratios between the available bandwidths for the upstream network devices (262). In general, data distribution unit 212 determines (N−1) ordered ratios for N upstream network devices. Forwarding component 224 then forwards the received packets according to the ratio(s) (264). Assume, for example, that data distribution unit 212 determines a ratio of M:N between available bandwidths for two upstream network devices. Forwarding component 224 would then forward M/(M+N) packets to the upstream network device having available bandwidth corresponding to M and N/(M+N) packets to the upstream network device having available bandwidth corresponding to N. Although "packets" are used for purposes of explanation, any unit of data (e.g., bytes) may be used for determining forwarded data.

In this manner, the method of FIG. 5 represents an example of a method including determining, by a first network device of a plurality of network devices forming an Internet protocol (IP) fabric, available bandwidths for at least a third network device and a fourth network device of the plurality of network devices to which the first network device is communicatively coupled, wherein the third network device and the fourth network device are between the first network device and a second network device of the plurality of network devices, determining a ratio between the available bandwidths for the third network device and the fourth network device, and forwarding data toward the second network device according to the ratio, such that a ratio between amounts of the data forwarded to the third network device and the fourth network device corresponds to the ratio between the available bandwidths.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    determining, by a first network device of a plurality of network devices forming an Internet protocol (IP) fabric, available bandwidths for at least a third network device and a fourth network device of the plurality of network devices to which the first network device is communicatively coupled, wherein the available bandwidths comprise respective available bandwidths from the third network device and the fourth network device toward a second network device of the plurality of network devices;
    determining a ratio between the available bandwidths for the third network device and the fourth network device; and
    forwarding data toward the second network device according to the ratio, such that a ratio between amounts of the data forwarded to the third network device and the fourth network device corresponds to the ratio between the available bandwidths, wherein forwarding the data comprises:
        forwarding an integer number M units of data to the third network device; and
        forwarding an integer number N units of data to the fourth network device, such that the ratio M:N is equal to the ratio between the available bandwidths.

2. The method of claim 1, wherein determining the available bandwidths comprises receiving advertisement data from the third network device and the fourth network device indicating respective available bandwidths for the third network device and the fourth network device.

3. The method of claim 2, wherein the advertisement data comprise respective border gateway protocol (BGP) extended community attributes indicating the respective available bandwidths.

4. The method of claim 1, wherein determining the available bandwidths comprises determining total available bandwidths and utilizations of the total available bandwidths, and wherein determining the ratio comprises determining the ratio based on the total available bandwidths and the utilizations.

5. The method of claim 4, wherein determining the ratio comprises:
    determining a first unutilized bandwidth for the third network device;
    determining a second unutilized bandwidth for the fourth network device; and
    determining the ratio as the ratio between the first unutilized bandwidth and the second unutilized bandwidth.

6. The method of claim 1, wherein the units of data comprise packets, and wherein forwarding comprises:
    forwarding the integer number M of the packets to the third network device; and
    forwarding the integer number N of the packets to the fourth network device, such that the ratio M:N is equal to the ratio between the available bandwidths.

7. The method of claim 1, wherein the units of data comprise bytes, and wherein forwarding comprises:
  forwarding the integer number M of the bytes to the third network device; and
  forwarding the integer number N of the bytes to the fourth network device, such that the ratio M:N is equal to the ratio between the available bandwidths.

8. The method of claim 1,
  wherein determining the available bandwidths comprises determining available bandwidths for each of the plurality of network devices to which the first network device is communicatively coupled and that are between the first network device and the second network device,
  wherein determining the ratio comprises determining ratios between the available bandwidths for each of the plurality of network devices to which the first network device is communicatively coupled and that are between the first network device and the second network device, and
  wherein forwarding the data comprises forwarding the data toward the second network device according to the ratios, such that ratios between amounts of the data forwarded to each of the network devices to which the first network device is communicatively coupled and that are between the first network device and the second network device correspond to the ratios between the available bandwidths.

9. The method of claim 1, further comprising:
  calculating an aggregate available bandwidth from the first network device to the third network device and the fourth network device; and
  advertising the aggregate available bandwidth to a fifth network device of the plurality of network devices.

10. The method of claim 9, wherein advertising comprises sending an indication of the aggregate available bandwidth to the fifth network device in a BGP extended community attribute.

11. The method of claim 9, further comprising calculating utilizations of the available bandwidths to the third network device and the fourth network device, wherein advertising comprises advertising the aggregate available bandwidth and the utilizations to the fifth network device.

12. The method of claim 1, wherein the plurality of network devices are interconnected using BGP.

13. The method of claim 1, wherein the available bandwidths for the third network device and the fourth network device include:
  a first available bandwidth representing an aggregation of available network bandwidths along paths from the third network device to the second network device; and
  a second available bandwidth representing an aggregation of available network bandwidths along paths from the fourth network device to the second network device.

14. A first network device of a plurality of network devices forming an Internet protocol (IP) fabric, the first network device comprising:
  a plurality of network interfaces communicatively coupled to at least a third network device and a fourth network device of the plurality of network devices between the first network device and a second network device of the plurality of network devices; and
  one or more hardware-based processors configured to:
    determine available bandwidths for the third network device and the fourth network device toward the second network device,
    determine a ratio between the available bandwidths for the third network device and the fourth network device, and
    forward data toward the second network device according to the ratio, such that a ratio between amounts of the data forwarded to the third network device and the fourth network device corresponds to the ratio between the available bandwidths, wherein to forward the data, the one or more hardware-based processors are configured to:
      forward an integer number M units of data to the third network device; and
      forward an integer number N units of data to the fourth network device,
    such that the ratio M:N is equal to the ratio between the available bandwidths.

15. The first network device of claim 14, wherein the one or more hardware-based processors are configured to receive, via the plurality of network interfaces, advertisement data from the third network device and the fourth network device indicating respective available bandwidths for the third network device and the fourth network device.

16. The first network device of claim 15, wherein the advertisement data comprise respective border gateway protocol (BGP) extended community attributes indicating the respective available bandwidths.

17. The first network device of claim 14, wherein the one or more hardware-based processors are configured to determine total available bandwidths and utilizations of the total available bandwidths, and wherein to determine the ratio, the one or more hardware-based processors are configured to determine the ratio based on the total available bandwidths and the utilizations.

18. The first network device of claim 14, wherein the units of data comprise packets or bytes, and wherein to forward the data, the one or more hardware-based processors are configured to:
  forward, via one of the plurality of network interfaces that is communicatively coupled to the third network device, the integer number M of the packets or bytes to the third network device; and
  forward, via one of the plurality of network interfaces that is communicatively coupled to the fourth network device, the integer number N of the packets or bytes to the fourth network device, such that the ratio M:N is equal to the ratio between the available bandwidths.

19. The first network device of claim 14, wherein the one or more hardware-based processors are configured to:
  determine available bandwidths for each of the plurality of network devices to which the first network device is communicatively coupled and that are between the first network device and the second network device,
  determine ratios between the available bandwidths for each of the plurality of network devices to which the first network device is communicatively coupled and that are between the first network device and the second network device, and
  forward the data toward the second network device according to the ratios, such that ratios between amounts of the data forwarded to each of the network devices to which the first network device is communicatively coupled and that are between the first network device and the second network device correspond to the ratios between the available bandwidths.

20. The first network device of claim 14, wherein the one or more hardware-based processors are configured to calculate an aggregate available bandwidth from the first network device to the third network device and the fourth network device, and advertise the aggregate available bandwidth to a fifth network device of the plurality of network devices.

21. The first network device of claim 20, wherein to advertise the aggregate available bandwidth, the one or more hardware-based processors are configured to send an indication of the aggregate available bandwidth to the fifth network device in a BGP extended community attribute.

22. A system comprising:
a plurality of network devices forming an Internet protocol (IP) fabric, the plurality of network devices including a first network device, a second network device, a third network device, and a fourth network device, wherein the first network device is communicatively coupled to the third network device and the fourth network device, and wherein the third network device and the fourth network device are between the first network device and the second network device,
wherein the first network device is configured to determine available bandwidths for the third network device and the fourth network device toward the second network device, determine a ratio between the available bandwidths for the third network device and the fourth network device, and forward data toward the second network device according to the ratio, such that a ratio between amounts of the data forwarded to the third network device and the fourth network device corresponds to the ratio between the available bandwidths, wherein to forward the data, the first network device is configured to forward an integer number M units of data to the third network device, and forward an integer number N units of data to the fourth network device, such that the ratio M:N is equal to the ratio between the available bandwidths.

23. A non-transitory computer-readable storage medium having stored thereon instructions that, when executed, cause a processor of a first network device of a plurality of network devices forming an Internet protocol (IP) fabric to:
determine available bandwidths for at least a third network device and a fourth network device of the plurality of network devices to which the first network device is communicatively coupled, wherein the available bandwidths comprise respective available bandwidths from the third network device and the fourth network device toward a second network device of the plurality of network devices;
determine a ratio between the available bandwidths for the third network device and the fourth network device; and
forward data toward the second network device according to the ratio, such that a ratio between amounts of the data forwarded to the third network device and the fourth network device corresponds to the ratio between the available bandwidths, wherein the instructions that cause the processor to forward the data comprise instructions that cause the processor to:
forward an integer number M units of data to the third network device; and
forward an integer number N units of data to the fourth network device, such that the ratio M:N is equal to the ratio between the available bandwidths.

24. The non-transitory computer-readable storage medium of claim 23, wherein the instructions that cause the processor to determine the available bandwidths comprise instructions that cause the processor to receive advertisement data from the third network device and the fourth network device indicating respective available bandwidths for the third network device and the fourth network device.

25. The non-transitory computer-readable storage medium of claim 24, wherein the advertisement data comprise respective border gateway protocol (BGP) extended community attributes indicating the respective available bandwidths.

26. The non-transitory computer-readable storage medium of claim 23,
wherein the instructions that cause the processor to determine the available bandwidths comprise instructions that cause the processor to determine total available bandwidths and utilizations of the total available bandwidths, and
wherein the instructions that cause the processor to determine the ratio comprise instructions that cause the processor to determine the ratio based on the total available bandwidths and the utilizations.

27. The non-transitory computer-readable storage medium of claim 23, wherein the units of data comprise packets or bytes, and wherein the instructions that cause the processor to forward comprise instructions that cause the processor to:
forward the integer number M of the packets or bytes to the third network device; and
forward the integer number N of the packets or bytes to the fourth network device, such that the ratio M:N is equal to the ratio between the available bandwidths.

28. The non-transitory computer-readable storage medium of claim 23,
wherein the instructions that cause the processor to determine the available bandwidths comprise instructions that cause the processor to determine available bandwidths for each of the plurality of network devices to which the first network device is communicatively coupled and that are between the first network device and the second network device,
wherein the instructions that cause the processor to determine the ratio comprise instructions that cause the processor to determine ratios between the available bandwidths for each of the plurality of network devices to which the first network device is communicatively coupled and that are between the first network device and the second network device, and
wherein the instructions that cause the processor to forward the data comprise instructions that cause the processor to forward the data toward the second network device according to the ratios, such that ratios between amounts of the data forwarded to each of the network devices to which the first network device is communicatively coupled and that are between the first network device and the second network device correspond to the ratios between the available bandwidths.

29. The non-transitory computer-readable storage medium of claim 23, further comprising instructions that cause the processor to:
calculate an aggregate available bandwidth from the first network device to the third network device and the fourth network device; and
advertise the aggregate available bandwidth to a fifth network device of the plurality of network devices.

30. The non-transitory computer-readable storage medium of claim 29, wherein the instructions that cause the processor to advertise comprise instructions that cause the processor to send an indication of the aggregate available bandwidth to the fifth network device in a BGP extended community attribute.

* * * * *